United States Patent [19]
Eckle

[11] Patent Number: 4,486,127
[45] Date of Patent: Dec. 4, 1984

[54] TRIANGULAR INDEXABLE CUTTING PLATE FOR LATHE TOOLS

[75] Inventor: Otto Eckle, Löchgau, Fed. Rep. of Germany

[73] Assignee: Komet Stahlhalter- und Werkzuegfabrik, Robert Breuning GmbH, Fed. Rep. of Germany

[21] Appl. No.: 399,394

[22] Filed: Jul. 19, 1982

[30] Foreign Application Priority Data

Aug. 27, 1981 [DE] Fed. Rep. of Germany ... 8125049[U]

[51] Int. Cl.³ .......................... B23B 27/16; B26D 1/00
[52] U.S. Cl. .................................. 407/114
[58] Field of Search ................ 407/113, 114, 115, 116

[56] References Cited

U.S. PATENT DOCUMENTS

| | | | |
|---|---|---|---|
| 3,137,917 | 6/1964 | Dowd | 407/114 |
| 4,084,917 | 4/1978 | Stumpp | 407/114 |
| 4,214,847 | 7/1980 | Kraemer | 407/114 |
| 4,297,058 | 10/1981 | Ambrust et al. | 407/113 |
| 4,371,296 | 2/1983 | Berstein et al. | 407/115 |

FOREIGN PATENT DOCUMENTS

2162682 7/1973 Fed. Rep. of Germany ...... 407/114

Primary Examiner—Leonidas Vlachos
Assistant Examiner—Jerry Kearns
Attorney, Agent, or Firm—Flynn, Thiel, Boutell & Tanis

[57] ABSTRACT

In a triangular turnround cutting plate, in particular for precision machining, a main cutting edge (3, 3a, 3b) defines an acute angle with the adjoining auxiliary cutting edge (4a, 4b, 4). A continuous radius (R) is provided between the two cutting edges (3, 3a, 3b and 4a, 4b, 4, respectively) and the length (L) of all three sides is the same. The radius (R) is in the range of 0.15 to 0.3 times the size of the length (L) of the sides of the turnround cutting plate (1) and the center (M) of this radius (R) is arranged offset from the main cutting edge (3, 3a, 3b) at a distance (a, a1) towards the center of the turnround cutting plate (1) which is in the range of 0 to 0.3 times the radius (R).

5 Claims, 5 Drawing Figures

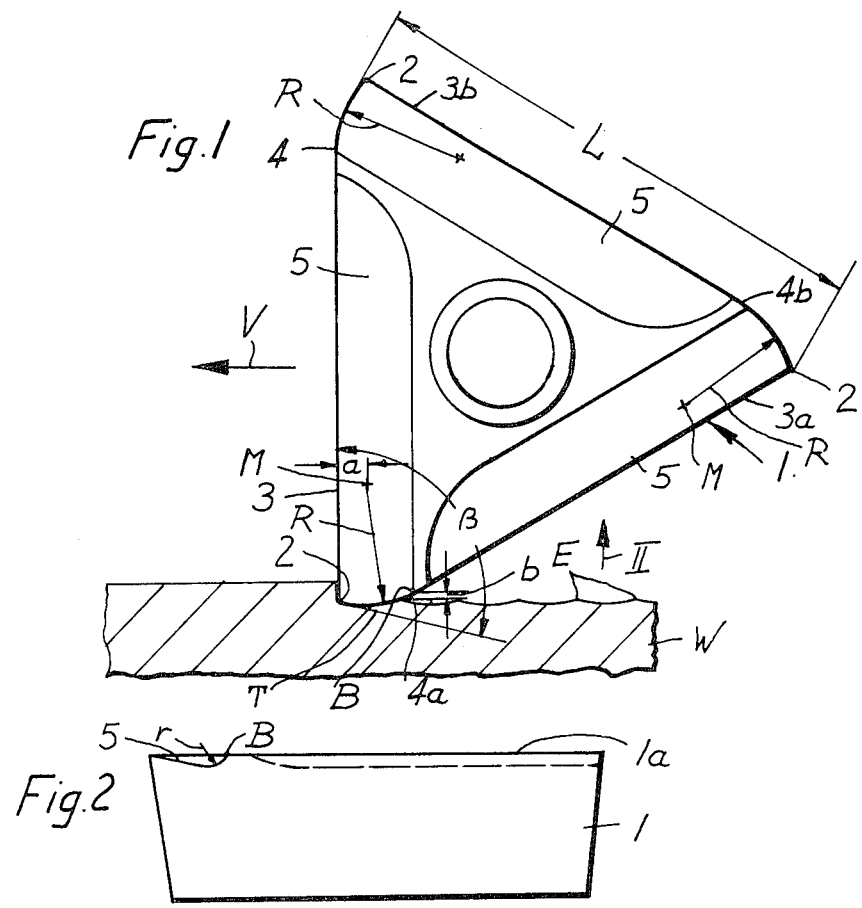
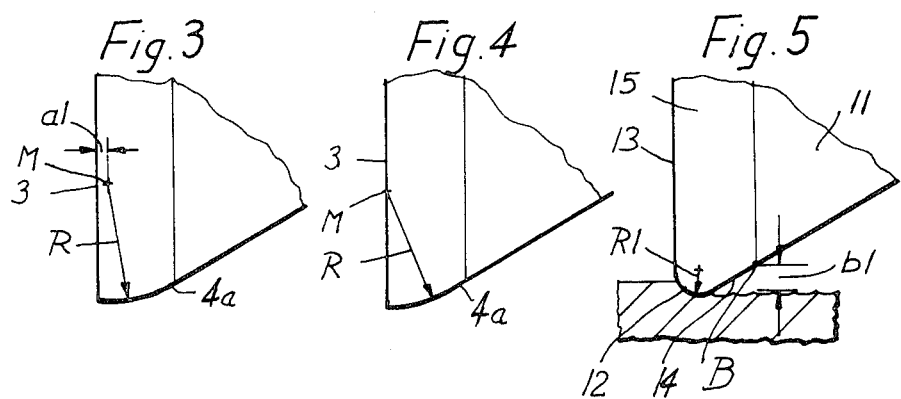

TRIANGULAR INDEXABLE CUTTING PLATE FOR LATHE TOOLS

FIELD OF THE INVENTION

The invention relates to a triangular indexable cutting plate for lathe tools, in particular for precision machining, wherein a main cutting edge encloses an acute angle with the adjoining auxiliary cutting edge, a radius is provided at the transition of the two cutting edges and the length of all three sides is the same.

BACKGROUND OF THE INVENTION

In triangular indexable cutting plates of this kind, part of an edge of the indexable cutting plate forms a main cutting edge in each case. As a rule, in precision turning this main cutting edge extends radially with respect to the workpiece. That part of the adjacent edge which adjoins the corner of the main cutting edge which is in use then forms an auxiliary cutting edge in each case, while the remaining part of this adjacent edge is also again a main cutting edge, which, however, is not in use. Only when a main cutting edge is worn out is the indexable cutting plate released from its holder, turned through 120° and then again inserted in the recess provided for it in the holder, so that now a part of another edge of the triangle forms the main cutting edge. In known indexable cutting plates of this kind, a radius of about 0.4 to 0.8 mm is provided in each case at the transition from the main cutting edge to the auxiliary cutting edge. The centre of this radius is at a distance from the main cutting edge and the auxiliary cutting edge which corresponds in each case to the radius itself, so that the radius passes over uniformly into the main cutting edge and the auxiliary cutting edge. A small radius of this kind at the transition from the main to the auxiliary cutting edge has the disadvantage that only a limited feed can be operated in precision turning, because otherwise the machined surface shows fine grooves which are frequently undesirable. The slow feed results in longer machining times and thereby also in higher machining costs. Moreover, the cutting tip with a relatively small radius of curvature is highly sensitive.

In indexable cutting plates having swarf guiding steps, there is also the further disadvantage that the transition between the swarf guiding step and the top of the indexable cutting plate and adjacent the surface machined at any given time is arranged at a fairly great distance from the workpiece surface. Because of this, turnings are able to pass through between the workpiece and the cutting plate, which may lead to damage to the machined surface. Moreover, since the swarf guiding step is not fully formed in the region of the cutting tip, the swarf is frequently not broken and unfavourable lengthy turnings are formed.

The problem underlying the invention is to provide a triangular indexable cutting plate for lathe tools, in particular for precision machining, of the kind mentioned at the beginning with which substantially greater feeds can be achieved, and thereby shorter production times, without impairing the machined workpiece surface, at the same time the life of the cutting edges is also increased and their susceptibility to breakage at the tip is reduced and, moreover, in cutting plates having swarf guiding steps, satisfactory breaking of the swarf is achieved without the risk of the swarf passing through between the surface of the workpiece and the cutting plate.

According to the invention, this problem is solved in that the radius is about 0.15 to 0.3 times the size of the length of the sides of the indexable cutting plate and the centre of this radius is arranged relative to the main cutting edge at a distance towards the centre of the cutting plate and perpendicular to the main cutting edge which correspond to about 0 to 0.3 times the radius.

Therefore, in comparison with known triangular indexable cutting plates, the radius provided at the transition from the main cutting edge to the auxiliary cutting edge is relatively large. While this radius passes over steadily, i.e. tangentially, into the auxiliary cutting edge, there is a tip angle of 90° or a little more at the transition between the radius and the main cutting edge. This relatively large tip angle makes the cutting plate very strong and unsusceptible to breakage at its tip. Surprisingly, it has been found that it is possible to operate with the novel indexable cutting plate at feed rates which are several times higher for the same quality of surface, so that shorter machining times are obtained and thereby also lower machining costs. Furthermore, surprisingly, it has been established that substantial freedom from vibration can be achieved as a result of the comparatively simple features provided according to the invention. In addition, the life of the cutting edges is longer than in the case of the indexable cutting plates known heretofore. Added to this is the fact that with cutting plates having swarf guiding steps a more favourable form and removal of swarf can be obtained. This can be attributed to the fact that the transition from the swarf guiding step to the top of the indexable cutting plate is brought up relatively close to the workpiece surface through the large radius of curvature. As a result, the swarf guiding step is also of optimum form in the region of the cutting tip and the desired bending of the swarf and the breaking thereof is thereby obtained. Turnings are also prevented from being able to pass through between the surface of the workpiece and the auxiliary cutting edge, which is important in particular in the machining of bores. Due to the longer life of the cutting edge, it is also possible to produce greater bore lengths for a constant or almost constant bore diameter, which is a problem in particular in the case of large bore diameters and great bore lengths, since due to the long path of contact between the cutting edge and workpiece in precision turning the cutting edge already wears down so considerably during the machining of a single bore that different bore diameters are obtained at the beginning and end of the bore.

BRIEF DESCRIPTION OF THE DRAWINGS

The invention is described in detail hereinafter with reference to embodiments shown in the drawing, in which:

FIG. 1 is a plan view of a first embodiment of the indexable cutting plate according to the invention;

FIG. 2 is a side view of the same in the direction II of FIG. 1;

FIGS. 3 and 4 show two more embodiments of the configuration of the indexable cutting plate at the corner thereof;

FIG. 5 shows the cutting tip or corner of a conventional indexable cutting plate in use.

DETAILED DESCRIPTION

In plan view, the indexable cutting plate 1 has substantially the form of an equilateral triangle with side lengths L of equal size. Starting from each corner 2 of the cutting plate, a main cutting edge 3, 3a, 3b, respectively, is provided. Of these three main cutting edges 3, 3a, 3b, however, there is always only one in use. In the embodiment illustrated, this is the main cutting edge 3, which is arranged radially with respect to the workpiece W to be machined. That part 4a of the adjacent main cutting edge 3a which adjoins the particular corner 2 that is in use on the main cutting edge 3 acts at the same time as an auxiliary cutting edge. Correspondingly, auxiliary cutting edges 4 and 4b are also present at the remaining edges of the indexable cutting plate 1. A radius R is provided in each case at the transition from the main cutting edges 3, 3a, 3b to the auxiliary cutting edges 4a, 4b, 4. This radius R is about 0.15 to 0.3 times the size of the length L of the sides of the indexable cutting plate 1. The centre M of this radius is moreover arranged at a perpendicular distance a from the associated main cutting edge 3. This distance is about 0 to 0.3 times as big as the radius itself. Furthermore, the centre M of the radius is so arranged that the radius passes over tangentially into the auxiliary cutting edge adjoining in each case.

Advantageously, the radius R is about 0.2 times as big as the length L of the sides of the indexable cutting plate 1. A distance a which is about 0.2 to 0.25 as big as the radius R has been found to be a favourable distance for the centre M of the radius from the main cutting edge 3. In the embodiment shown in FIG. 1, the length L of the sides of the indexable cutting plate is 9.12 mm, the radius R is 2 mm and the distance a is 0.4 mm.

The novel shape of the transition between the main cutting edge and the auxiliary cutting edge with a relatively large radius R proves to be particularly advantageous in indexable cutting plates having a swarf guiding step 5 adjacent each of the the main cutting edges 3, 3a, 3b. This swarf guiding step extends in each case from a corner 2 into the vicinity of the swarf guiding step of the adjoining main cutting edge, but does not pass over into the swarf guiding step of the adjoining main cutting edge. The profile of the swarf guiding steps 5 can be seen from FIG. 2, in which it can be perceived that the swarf guiding step 5 passes over with a radius r into the top 1a of the indexable plate. Bending of the turnings and breaking thereof in known manner is to be achieved by means of this radius r.

The technical advance achievable with the indexable cutting plate according to the invention will now be illustrated in detail by comparison of FIGS. 5 and 1. FIG. 5 illustrates the shape of the corner of a conventional triangular indexable cutting plate, wherein the operative main cutting edge 13 passes over into the auxiliary cutting edge 14 with a relatively small radius R1. This cutting plate also has a swarf guiding step 15. Due to the feed, the known indexable cutting plate 11 leaves grooves behind in the machined workpiece surface, the profile of which grooves corresponds to the radius R1. If the raised portions between the grooves must not exceed a certain height in order to achieve a certain maximum surface roughness, it is necessary to operate at a slow feed rate. Furthermore, it is recognizable (FIG. 5) that the point B at which the radius r (FIG. 2) of the swarf guiding step 15 passes over into the top of the indexable cutting plate 11 is arranged so that it is removed a comparatively great distance b1 from the machined workpiece surface. Because of this, turnings can pass through between the auxiliary cutting edge 14 and the workpiece surface in the region of the swarf guiding step 15. Moreover, in the very region of the cutting corner 12, the swarf guiding step 15 is not fully formed, because the radius r is missing immediately adjacent the cutting corner 12.

In the indexable cutting plate 1 according to the invention, on the other hand, for the same surface roughness, i.e. for the same height of the raised portions left between the individual grooves, the feed can be about 3 to 4 times as fast as with the previously known indexable cutting plate 11. The greater feed rate can be recognized in FIG. 1 by the greater distance separating the raised portions E present between the depressions. At the same time, it can also be recognized, however, that the height of the raised portions E is the same as in FIG. 5. Furthermore, it can be gathered from FIG. 1 that the point at which the swarf guiding step 5 passes over into the top 1a in the region of the auxiliary cutting edge 4a is located substantially closer to the machined surface at a very small distance b. Because of this, no turnings can pass through between the auxiliary cutting edge 4a and the machined workpiece surface in the region of the swarf guiding step 5. Moreover, it can also be seen, however, that the swarf guiding step 5 is also fully formed in the region of the cutting corner or tip 2, that is that the radius r bending and breaking the turnings is also present adjacent the cutting corner or tip 2. As a result, the swarf guiding step can develop its full effect in the very region of the cutting corner which is important in precision machining. Moreover, it can be seen from FIG. 1 that a comparatively large angle $\beta$ of more than 90° exists between the main cutting edge 3 and the tangent T to the radius R in the region of the cutting edge 2. In this way, the cutting tip becomes very strong and unsusceptible to breakage. Consequently, a longer life of the cutting edge can also be relied on. Due to the comparatively strong form of the cutting tip 2, it wears away less markedly. In combination with the higher permissible feed rate, very much greater lengths of bore with a constant or almost constant bore diameter can now be produced.

It will be shown with reference to FIGS. 3 and 4 that it is also possible to vary the distance a of the centre M of the radius R. In the embodiment shown in FIG. 3, the distance a1 is smaller than in the embodiment shown in FIG. 1. In the embodiment shown in FIG. 4, the distance is equal to zero, that is the centre M of the radius R lies directly on the main cutting edge 3. Of course, it is also possible to choose the distance a greater than is shown in FIG. 1. As has already been mentioned hereinbefore, however, a distance of about 0.2 to 0.25 times the radius R has proved to be favourable, since then the angle $\beta$ is relatively large and the feed pressure and the back pressure are likewise in a favourable range. Moreover, by this means the lowest degree of surface roughness can also be achieved compared with the embodiments shown in FIGS. 3 and 4. It should also be mentioned that in the drawing the direction of feed is indicated by the reference V.

The conformation according to the invention could also find application in analogous manner in other indexable cutting plates in which the main cutting edge passes over into the auxiliary cutting edge at an acute angle. What is meant here is indexable cutting plates which have the plan of a parallelogram or a rhombus.

The embodiments of the invention in which an exclusive property or privilege is claimed are defined as follows:

1. In a triangular indexable cutting plate for precision machining wherein the length of all three sides is the same, one of said sides being a main cutting edge, the remainder of said sides being auxiliary cutting edges, wherein a main cutting edge defines an acute angle with an adjoining auxiliary cutting edge, and a radius is provided at the transition between said main cutting edge and said adjoining cutting edges, comprising the improvement wherein said radius (R) is uniformly curved between said main cutting edge and said auxiliary cutting edge and is in the range of 0.15 to 0.3 times the size of the length (L) of said sides of said indexable cutting plate, the centre (M) of said radius (R) being oriented at said main cutting edge or at a perpendicular distance (a, a1) from said main cutting edge towards the centre of said cutting plate which is up to 0.3 times said radius (R).

2. The indexable cutting plate according to claim 1, wherein said radius (R) is about 0.2 times as big as the length (L) of the sides.

3. The indexable cutting plate according to claim 1 or 2, wherein said distance (a) of said centre (M) of said radius (R) from said main cutting edge is about 0.2 to 0.25 times as big as said radius (R).

4. The indexable cutting plate according to any one of claims 1 to 3, wherein adjacent each of said cutting edges said plate has a swarf guiding step extending from a corner into the vicinity of the swarf guiding step of the next adjoining cutting edge.

5. The indexable cutting plate according to claim 1, wherein a tangent to said radius adjoins said cutting edge at an angle ($\beta$) which is 90° and greater.

* * * * *